United States Patent
Chung et al.

(10) Patent No.: US 11,301,665 B2
(45) Date of Patent: Apr. 12, 2022

(54) FINGERPRINT AND PROXIMITY SENSING APPARATUS AND SENSING PROCESS THEREOF

(71) Applicant: Novatek Microelectronics Corp., Hsinchu (TW)

(72) Inventors: Jung-Chen Chung, Hsinchu County (TW); Chi-Ting Chen, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 113 days.

(21) Appl. No.: 16/531,126

(22) Filed: Aug. 5, 2019

(65) Prior Publication Data

US 2020/0265206 A1    Aug. 20, 2020

Related U.S. Application Data

(60) Provisional application No. 62/808,236, filed on Feb. 20, 2019.

(51) Int. Cl.
*G06K 9/00* (2006.01)
*G06F 21/32* (2013.01)

(52) U.S. Cl.
CPC ........... *G06K 9/0004* (2013.01); *G06F 21/32* (2013.01); *G06K 2009/0006* (2013.01)

(58) Field of Classification Search
CPC ......... G06K 9/0004; G06K 2009/0006; G06K 9/20; G06K 9/209; G06K 9/2081; G06F 21/32; G01S 7/4808
See application file for complete search history.

(56) References Cited

U.S. PATENT DOCUMENTS

| | | | | |
|---|---|---|---|---|
| 9,711,493 | B2 * | 7/2017 | Lin | ........................ H01L 25/167 |
| 10,366,272 | B2 * | 7/2019 | Song | ..................... G06K 9/0004 |
| 2009/0046903 | A1 * | 2/2009 | Corcoran | ........... G06K 9/00046 382/124 |
| 2015/0235098 | A1 * | 8/2015 | Lee | ....................... G06K 9/0002 715/709 |
| 2017/0187948 | A1 * | 6/2017 | Wang | ....................... G02B 7/34 |
| 2017/0300736 | A1 | 10/2017 | Song et al. | |
| 2017/0344787 | A1 * | 11/2017 | Cho | ..................... G06F 3/04886 |

(Continued)

FOREIGN PATENT DOCUMENTS

| | | |
|---|---|---|
| CN | 107545234 | 1/2018 |
| CN | 108008778 | 5/2018 |

OTHER PUBLICATIONS

"Office Action of Taiwan Counterpart Application", dated Sep. 28, 2020, p. 1-p. 11.

*Primary Examiner* — Emily C Terrell
*Assistant Examiner* — Molly Delaney
(74) *Attorney, Agent, or Firm* — JCIPRNET

(57) ABSTRACT

A fingerprint and proximity sensing apparatus for fingerprint recognizing and proximity sensing is provided. The fingerprint and proximity sensing apparatus includes a display panel, a fingerprint sensor, and at least one proximity sensing light emitting diode. The fingerprint sensor has an optical sensing array. The optical sensing array is configured to receive a first light emitted from the display panel and a second light emitted from the at least one proximity sensing light emitting diode at different time periods. The first light and the second light have different ranges of wave length. A sensing process is also provided.

19 Claims, 10 Drawing Sheets

(56) References Cited

U.S. PATENT DOCUMENTS

2017/0372114 A1   12/2017  Cho et al.
2018/0031745 A1*  2/2018  Kim ...................... G02B 5/281
2018/0074627 A1*  3/2018  Kong ................. G06K 9/00013
2018/0348949 A1* 12/2018  Kim ..................... G06K 9/0002
2019/0080137 A1*  3/2019  Wu ......................... G06K 9/22

* cited by examiner

FINGERPRINT AND PROXIMITY SENSING APPARATUS AND SENSING PROCESS THEREOF

CROSS-REFERENCE TO RELATED APPLICATION

This application claims the priority benefits of U.S. provisional application Ser. No. 62/808,236, filed on Feb. 20, 2019. The entirety of the above-mentioned patent application is hereby incorporated by reference herein and made a part of this specification.

BACKGROUND

Technical Field

The disclosure relates to sensing apparatus and a sensing process, more specifically, to a fingerprint and proximity sensing apparatus and a sensing process thereof.

Description of Related Art

In the conventional way of using the under-display optical fingerprint sensor, a complementary metal oxide semiconductor (CMOS) image sensor is placed under display screen, which is an organic light-emitting diode display (OLED), of the mobile phone. The display screen of the mobile phone emits light onto the finger touching the display screen, so that the optical sensing array of the CMOS image sensor recognizes the fingerprint of the finger placed on the display screen of the mobile phone.

Further, the basic principle of the proximity sensor is to use the light-emitting diode (LED) on one side to emit light onto the object, and to receive the light by a photo-diode at the other side distant from the one side. The closer the distance is, the more sensing light can be received, so as to determine the distance from the object to the proximity sensor. Currently, the proximity sensor is often combined with an ambient light sensor and is placed at the area beside the front lens on the display screen of the mobile phone. In other words, it is still necessary to place two observation holes (for emitting light and receiving light) which have size and a distance therebetween in the display screen of the mobile phone. That is to say, the optical fingerprint sensor and proximity sensor are two separate components performing two different functions in the mobile phone.

SUMMARY

The disclosure is directed to a fingerprint and proximity sensing apparatus capable of performing both fingerprint recognizing function and proximity sensing function in order to increase the area for displaying image and reducing space and cost.

The disclosure is directed to a sensing process for the purpose of preventing the proximity sensing light emitting diode and the display panel from being turned on at the same time.

The disclosure provides a fingerprint and proximity sensing apparatus for fingerprint recognizing and proximity sensing. The fingerprint and proximity sensing apparatus includes a display panel, a fingerprint sensor, and a proximity sensing light emitting diode. The fingerprint sensor has an optical sensing array. The optical sensing array is configured to receive a first light emitted from the display panel and a second light emitted from the proximity sensing light emitting diode at different time periods. The first light and the second light have different ranges of wave length.

In one embodiment of the disclosure, the different time periods comprises a first time period and a second time period different from each other.

In one embodiment of the disclosure, in the first time period, an object is in contact with the display panel, the first light is emitted from the display panel and then is reflected by the object to the optical sensing array for fingerprint recognition.

In one embodiment of the disclosure, in the second time period, an object is in front of the display panel, the second light is emitted from the proximity sensing light emitting diode and then is reflected by the second object to the optical sensing array for proximity sensing.

In one embodiment of the disclosure, the proximity sensing light emitting diode is an infrared light emitting diode, and the second light emitted from the proximity sensing light emitting diode comprises an infrared light.

In one embodiment of the disclosure, the display panel comprises a light emitting diode display.

In one embodiment of the disclosure, the fingerprint sensor and the proximity sensing light emitting diode are disposed under the display panel.

In one embodiment of the disclosure, the proximity sensing light emitting diode is disposed adjacent to the optical sensing array of the fingerprint sensor.

In one embodiment of the disclosure, the proximity sensing light emitting diode is integrated with the fingerprint sensor.

In one embodiment of the disclosure, the fingerprint sensor is disposed in the display panel and the proximity sensing light emitting diode is disposed under the display panel.

In one embodiment of the disclosure, the optical sensing array includes a fingerprint sensing array and a proximity sensing array.

In one embodiment of the disclosure, the fingerprint sensing array and the proximity sensing array are separated from each other.

In one embodiment of the disclosure, the fingerprint sensing array and the proximity sensing array overlap with each other.

In one embodiment of the disclosure, the fingerprint and proximity sensing apparatus further includes an infrared light cut filter configured to block infrared light, and the infrared light cut filter is disposed on the fingerprint sensing array.

In one embodiment of the disclosure, the fingerprint and proximity sensing apparatus further includes an infrared filter configured to allow infrared light passing through, and the infrared filter is disposed on the proximity sensing array.

In one embodiment of the disclosure, the fingerprint sensing array and the proximity sensing array are driven by a same circuit.

The disclosure provides a fingerprint and proximity sensing apparatus for fingerprint recognizing and proximity sensing. The fingerprint and proximity sensing apparatus includes a display panel and a fingerprint sensor. The display panel includes a plurality of light emitting diodes (LEDs). The fingerprint sensor has an optical sensing array. The optical sensing array is configured to receive a first light and a second light emitted from the LEDs of the display panel at a first time period and a second time period, respectively. In the first time period, a first object is in contact with the display panel, the first light is emitted from the display panel and then is reflected by the first object to the optical sensing array for fingerprint recognition. In the second time period, a second object is in front of but not in contact with the display panel, and the second light is emitted from the display panel and then is reflected by the second object to the optical sensing array for proximity sensing.

The disclosure provides a sensing process in a phone with a fingerprint and proximity sensing apparatus having a display panel, a fingerprint sensor, and a proximity sensing light emitting diode. The proximity sensing process includes steps of starting a phone call; detecting whether an object is in contact with the display panel; turning off the display panel when the object is in contact with the display panel; turning on the proximity sensing light emitting diode for proximity sensing; determining whether the object is in front of the display panel; turning on the display panel when the object is not in front of the display panel; determining whether the phone call is ended; and turning off the proximity sensing light emitting diode when the phone call is ended.

In one embodiment of the disclosure, the proximity sensing process further includes a step of continuing to detect when the object is not in contact with the display panel.

In one embodiment of the disclosure, the proximity sensing process further includes a step of continuing to turn on the proximity sensing light emitting diode for proximity sensing when the object is in front of the display panel.

In one embodiment of the disclosure, the proximity sensing process further includes a step of returning to detect whether the object is in contact with the display panel when the phone call is not ended.

Based on the above, in the embodiments of the disclosure, since the proximity sensing light emitting diode is disposed adjacent to the optical sensing array, the optical sensing array can be used to receive both the first light emitted from the display panel and the second light emitted from the proximity sensing light emitting diode at different time periods in order to perform both fingerprint recognizing function and proximity sensing function. That is to say, there is no need to have two different devices to respectively perform fingerprint recognizing function and proximity sensing function. To be more specific, it is not necessary to place a proximity sensor placed in the display panel, so the area of the display panel used for displaying image becomes bigger. For example, when the fingerprint and proximity sensing apparatus is applied to a smartphone, the proximity sensor is not placed at the area beside the front lens of the display panel of the smartphone. Therefore, the size of the area beside the front lens is reduced and thus save the space under the display panel of the smartphone.

In addition, the fingerprint sensing array and the proximity sensing array are driven by the same circuit, so as to reduce space (chip area) and cost.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
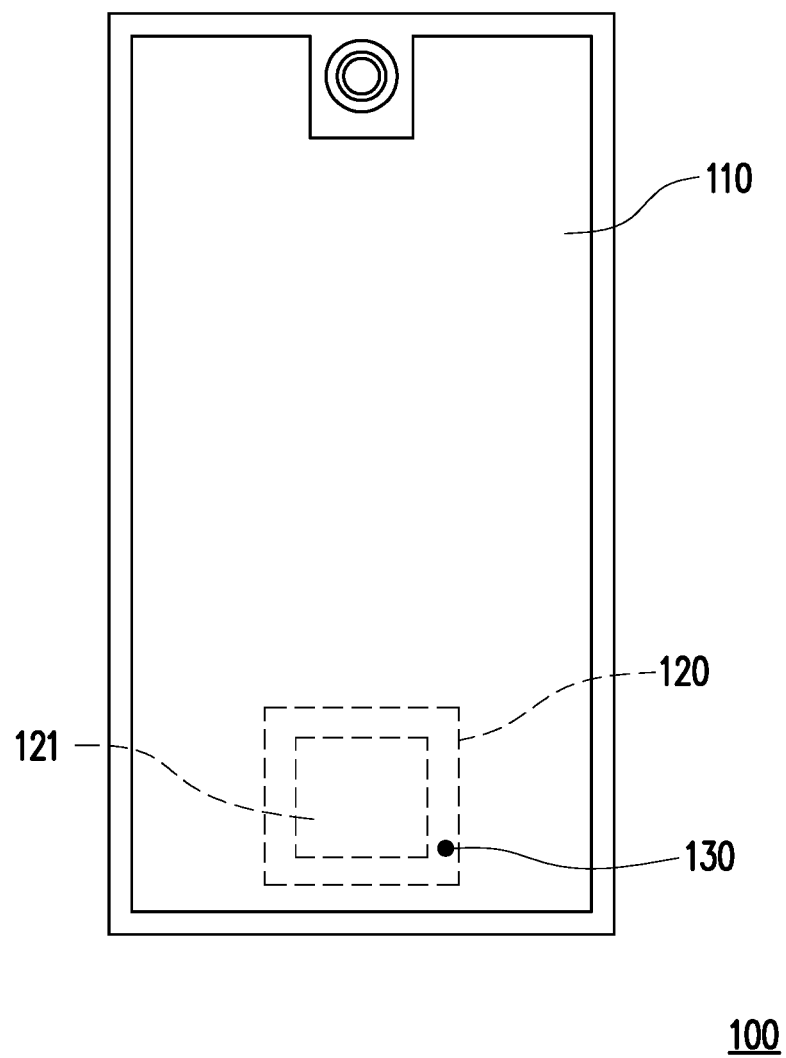
FIG. 1 is a schematic top view of a fingerprint and proximity sensing apparatus according to one embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

FIG. 1 is a schematic top view of a fingerprint and proximity sensing apparatus according to one embodiment of the disclosure. As shown in FIG. 1, a fingerprint and proximity sensing apparatus 100 is used for both fingerprint recognizing and proximity sensing. The fingerprint and proximity sensing apparatus 100 includes a display panel 110, a fingerprint sensor 120, and at least one proximity sensing light emitting diode 130. The fingerprint sensor 120 can have a sensing array such as an optical sensing array 121. The optical sensing array 121 may include one or more photo-diodes. The proximity sensing light emitting diode 130 is disposed adjacent to the optical sensing array 121 of the fingerprint sensor 120.

The optical sensing array 121 is configured to receive light (referred to as "first light") from the display panel 110 and light (referred to as "second light") from the proximity sensing light emitting diode 130 at different time periods. The first light L1 and the second light L2 have different ranges of wave length.

Figure 2:
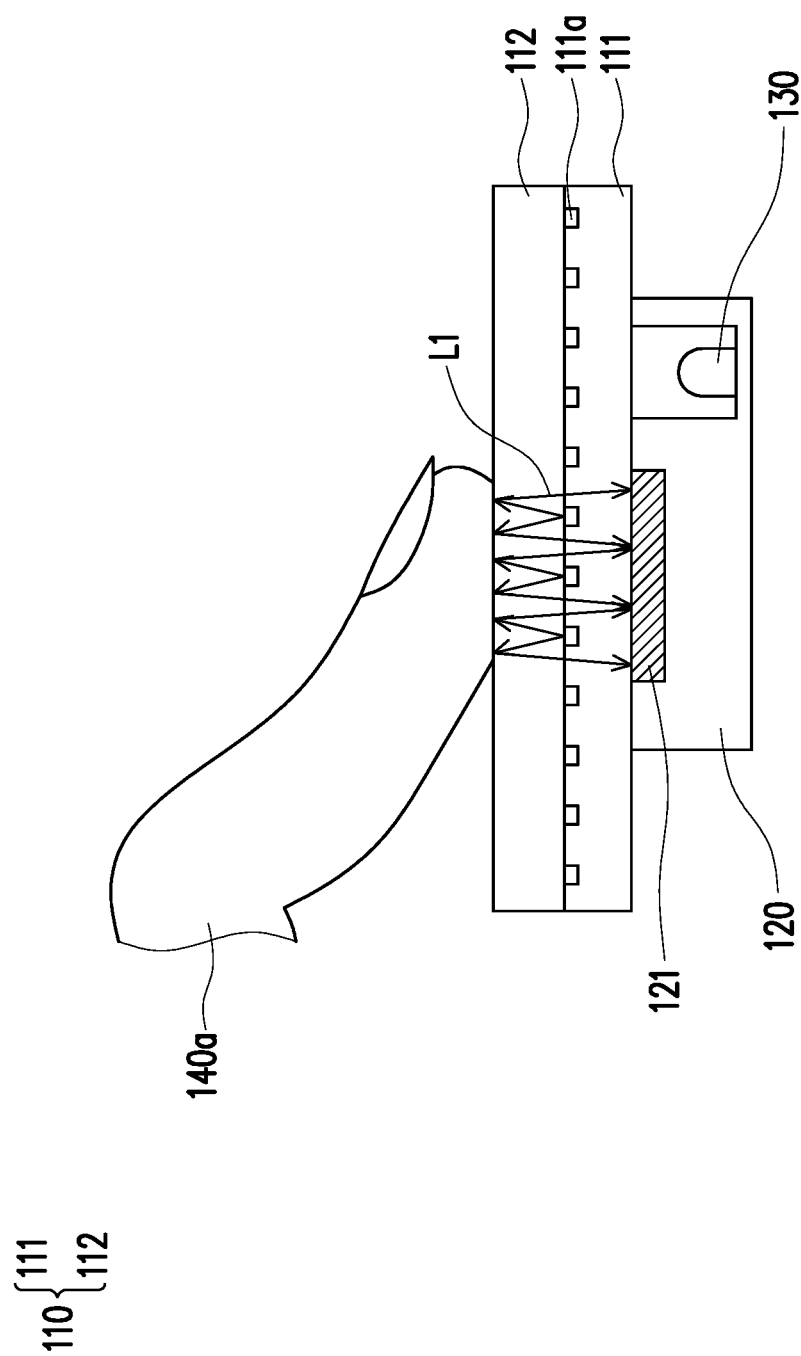
FIG. 2 is cross-sectional view of the fingerprint and proximity sensing apparatus of FIG. 1 at the first time period.
Figure 3:
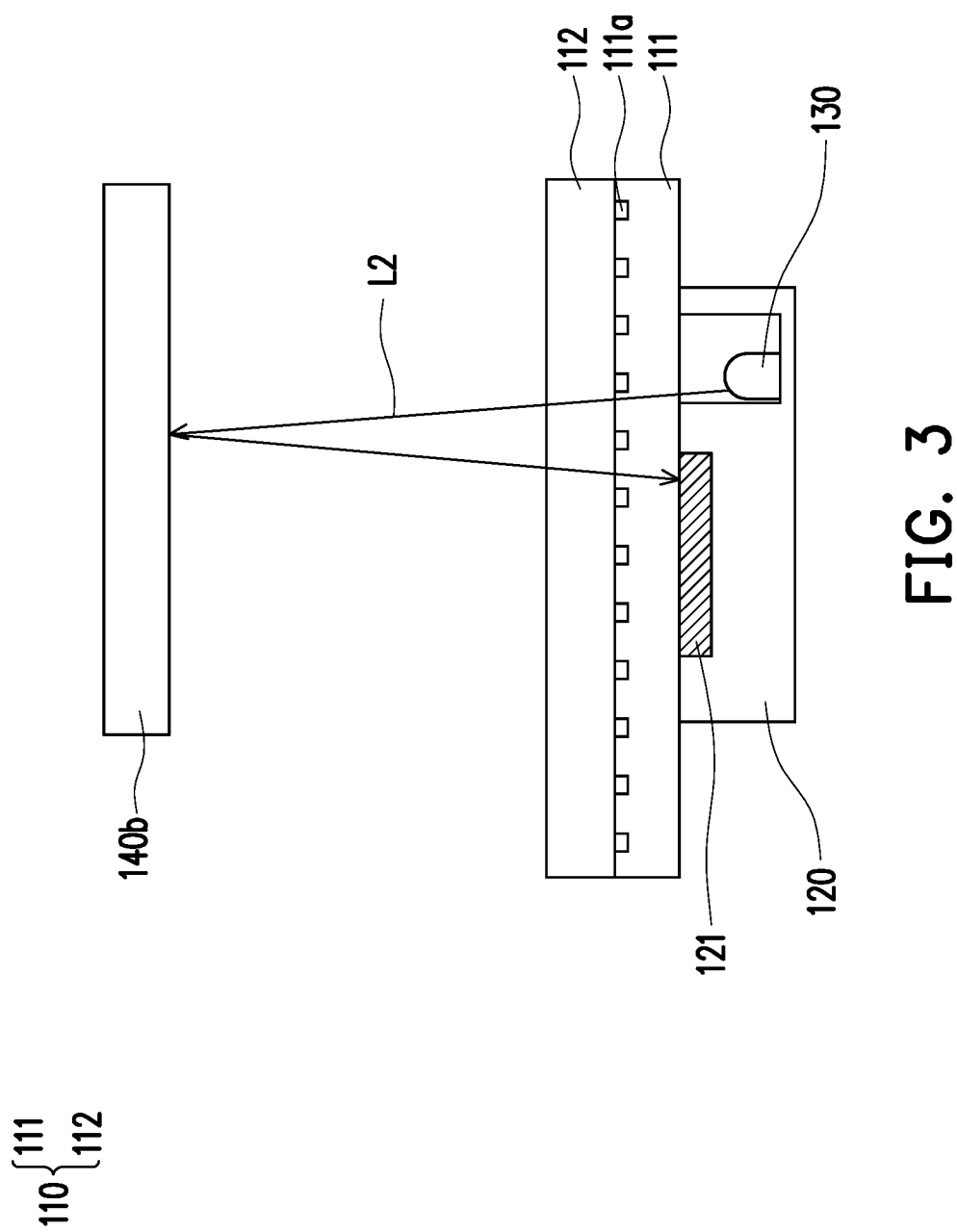
FIG. 3 is cross-sectional view of the fingerprint and proximity sensing apparatus of FIG. 1 at the second time period.

FIG. 2 is cross-sectional view of the fingerprint and proximity sensing apparatus of FIG. 1 at a first time period according to an embodiment. FIG. 3 is cross-sectional view of the fingerprint and proximity sensing apparatus of FIG. 1 at a second time period which is preferably (but not limitedly) different from the first time period according to an embodiment. Referring to FIG. 2 and FIG. 3, the functions of fingerprint recognizing and proximity sensing will be further described. The optical sensing array 121 is configured to receive the first light L1 from the display panel 110 and the second light L2 from the proximity sensing light emitting diode 130 at different time periods. The first light L1 and the second light L2 have different ranges of wave length.

To be more specific, the different time periods include the first time period T1 and the second time period T2 different from each other. In the first time period T1, there is an object touching the display panel 110, and the fingerprint and proximity sensing apparatus 100 performs fingerprint recognizing function but may not perform proximity sensing function. Additionally, in the second time period T2, there is an object in front of the display panel 110 but not touching the display panel 110, and the fingerprint and proximity sensing apparatus 100 performs proximity sensing function but may not perform fingerprint recognizing function.

In details, in the first time period T1, as shown in FIG. 2, the first object 140a is in contact with the display panel 110 at a position corresponding to the optical sensing array 121. The first object 140a may be a finger as an example, but the disclosure is not limited thereto. The display panel 110 includes a display and touch panel 111 and a transparent protective layer 112. The display and touch panel 111 may include a light emitting diode display 111a which includes a plurality of organic light-emitting diodes (OLEDs) or a plurality of micro light emitting diodes (micro-LEDs). In other words, the light emitting diode display 111a may be an organic light-emitting diode display or a micro light emitting diode display, but the disclosure is not limited thereto. The first light L1 is emitted from the light emitting diode display 111a of the display and touch panel 111 of the display panel 110 and is transmitted to the first object 140a. Next, the first light L1 is reflected by the first object 140a and then passes through the gaps between the light emitting diodes of the light emitting diode display 111a to reach the optical sensing array 121. That is to say, the fingerprint image of the first object 140a is reflected onto the optical sensing array 121 of the fingerprint sensor 120 by using the first light L1. Therefore, the fingerprint image of the first object 140a is obtained and the fingerprint recognizing function is accomplished. It should be noted here, the proximity sensing light emitting diode 130 is turned off in the in the first time period T1. Further, the fingerprint and proximity sensing apparatus 100 may be applied to smartphone, tablet or other similar electronic devices, the disclosure is not limited thereto. The first time period T1 may be the time period that the user needs to provide the fingerprint for identification purpose, such as unlock the smartphone or unlock an app in the smartphone, etc.

In the second time period T2, as shown in FIG. 3, the second object 140b is in front of the display panel 110. The second object 140b may be the cheek of the user as an example, but the disclosure is not limited thereto. The second light L2 is emitted from the proximity sensing light emitting diode 130 and is transmitted to the second object 140b. Next, the second light L2 is reflected by the object 140b and then passes through the gaps between the light emitting diodes of the light emitting diode display 111a to reach the optical sensing array 121. Therefore, the presence of the second object 140b is determined. Further, the larger the distance between the second object 140b and the display panel 110 is, the less second light L2 is received by the optical sensing array 121. In other words, the shorter the distance between the second object 140b and the display panel 110 is, the more second light L2 is received by the optical sensing array 121. Therefore, the distance between the second object 140b and the display panel 110 is determined according to the quantity or the brightness of the second light L2 received by the optical sensing array 121.

Consequently, the presence of the second object 140b and the distance between the second object 140b and the display panel 110 are determined. However, in case that there is no object in front of the display panel 110, the second light L2 is not reflected and the optical sensing array 121 receives none of the second light L2. Therefore, the absence of the object in front of the display panel 110 is also determined. As a result, the proximity sensing function is accomplished.

In the present embodiment, the proximity sensing light emitting diode 130 is an infrared light emitting diode, so the second light L2 emitted from the proximity sensing light emitting diode 130 is an infrared light. The first light L1 is visible light emitted from the display panel 110. In addition, the fingerprint sensor 120 and the proximity sensing light emitting diode 130 are disposed under the display panel 110. In the present embodiment, not only the proximity sensing light emitting diode 130 is disposed adjacent to the optical sensing array 121 of the fingerprint sensor 120, the proximity sensing light emitting diode 130 is also integrated with the fingerprint sensor 120. To be more specific, as shown in FIG. 2 and FIG. 3, the proximity sensing light emitting diode 130 is disposed in the fingerprint sensor 120. However, the disclosure is not limited thereto. For example, in case that the fingerprint and proximity sensing apparatus 100 is applied to the smartphone, the second time period T2 is the time period that the user are making a phone call.

Based on the above, since the proximity sensing light emitting diode 130 is disposed adjacent to the optical sensing array 121, the optical sensing array 121 can be used to receive both the first light L1 emitted from the display panel 110 and the second light L2 emitted from the proximity sensing light emitting diode at different time periods in order to perform both fingerprint recognizing function and proximity sensing function. That is to say, there is no need to have two different devices to respectively perform fingerprint recognizing function and proximity sensing function. To be more specific, it is not necessary to place a proximity sensor placed in the display panel 110, so the area of the display panel used for displaying image becomes larger. Take a smartphone as an example, when the fingerprint and proximity sensing apparatus 100 is applied to a smartphone, the proximity sensor is not placed at the area beside the front lens of the display panel of the smartphone. Therefore, the size of the area beside the front lens is reduced and thus save the space under the display panel of the smartphone.

Figure 4:
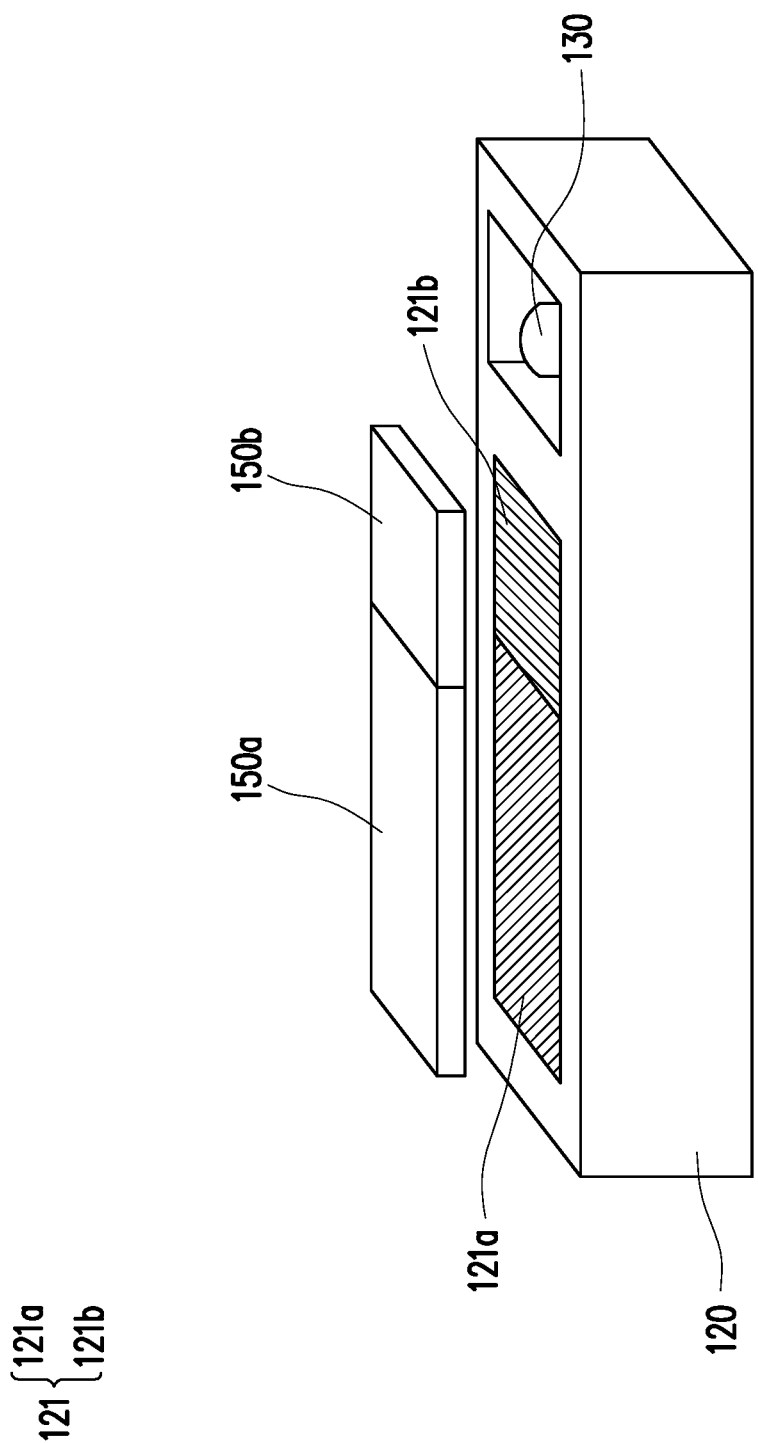
FIG. 4 is a three-dimensional schematic view of a fingerprint and proximity sensing apparatus according to another embodiment of the disclosure.

FIG. 4 is a partial and three-dimensional schematic view of a fingerprint and proximity sensing apparatus according to another embodiment of the disclosure. A fingerprint and proximity sensing apparatus 100a in FIG. 4 is similar to the fingerprint and proximity sensing apparatus 100 of the previous embodiment, only the differences will be described hereinafter. Only the fingerprint sensor 120 and the proximity sensing light emitting diode 130 of the fingerprint and proximity sensing apparatus 100a are shown in FIG. 4. As illustrated in FIG. 4, the optical sensing array 121 of the fingerprint sensor 120 of the fingerprint and proximity sensing apparatus 100a includes a fingerprint sensing array 121a and a proximity sensing array 121b. The fingerprint sensing array 121a and the proximity sensing array 121b are separated from each other, but the disclosure is not limited thereto. Each of the fingerprint sensing array 121a and the proximity sensing array 121b includes one or more photodiodes.

Additionally, in the present embodiment, the fingerprint and proximity sensing apparatus 100a includes an infrared light cut filter 150a and an infrared filter 150b. The infrared light cut filter 150a is configured to block infrared light and is disposed on the fingerprint sensing array 121a. The infrared filter 150b is configured to allow infrared light passing through and is disposed on the proximity sensing array 121b.

Therefore, in the first time period T1, when the first light L1, which is visible light and shown in FIG. 2, is reflected by the first object 140a to the fingerprint sensor 120, the first light L1 passes through the infrared light cut filter 150a to reach the fingerprint sensing array 121a in order to obtain the fingerprint image of the first object 140a, and the first light L1 is blocked by the infrared filter 150b and cannot reach the proximity sensing array 121b. In the second time period T2, when the second light L2, which is infrared light and shown in FIG. 3, is reflected by the second object 140b to the fingerprint sensor 120, the second light L2 passes through the infrared filter 150b to reach the proximity sensing array 121b for sensing proximity of the second object 140b, and the second light L2 is blocked by the infrared light cut filter 150a and cannot reach the fingerprint sensing array 121a. Therefore, the infrared light cut filter 150a and the infrared filter 150b are used for purpose of enhancing quality of the fingerprint image obtained in the first period and accuracy of proximity sensing in the second period.

In other embodiments, the fingerprint sensing array and the proximity sensing array may overlap with each other or may be combined with each other. The fingerprint sensing array and the proximity sensing array may be the same array which receives the first light and the second light at different time periods. It should be noted here, the purpose of receiving the first light and the second light at different time periods is enhancing quality of the fingerprint image and accuracy of proximity sensing.

Figure 5A:
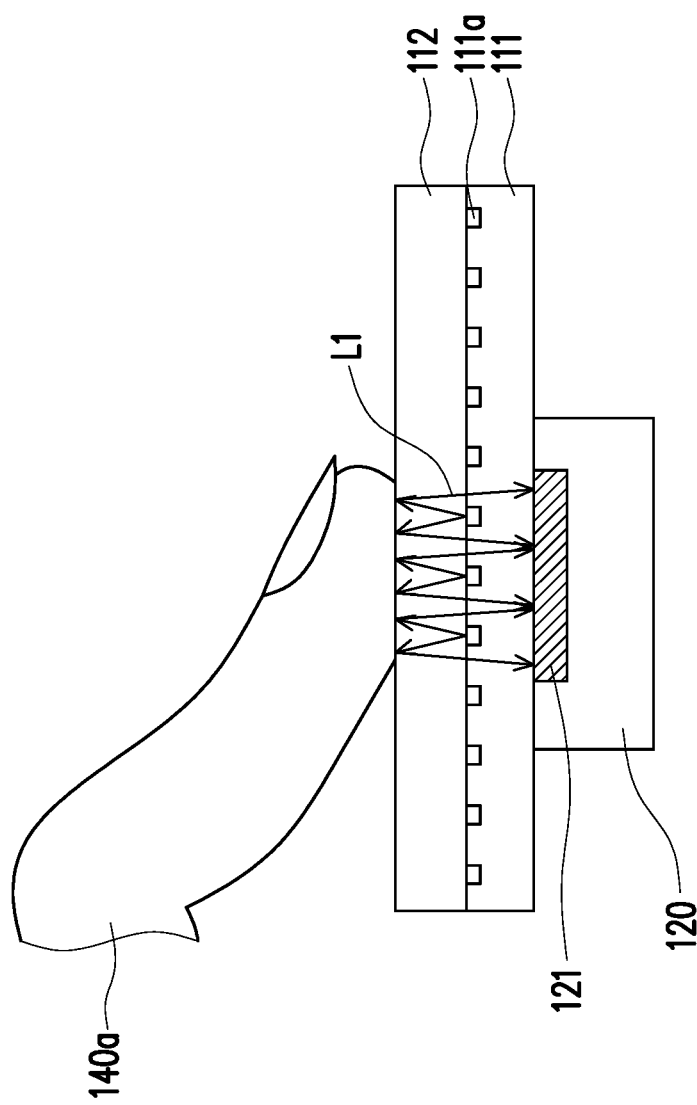
FIG. 5A is a cross-sectional schematic view of a fingerprint and proximity sensing apparatus at the first time period according to another embodiment of the disclosure.
Figure 5B:
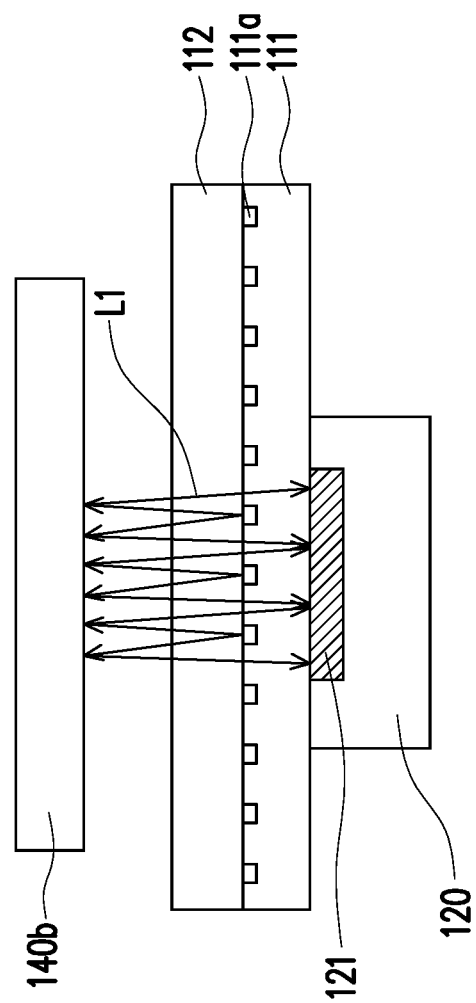
FIG. 5B is a cross-sectional schematic view of the fingerprint and proximity sensing apparatus in FIG. 5A at the second time period.

FIG. 5A is a cross-sectional schematic view of a fingerprint and proximity sensing apparatus at the first time period according to another embodiment of the disclosure. FIG. 5B is a cross-sectional schematic view of the fingerprint and proximity sensing apparatus in FIG. 5A at the second time period. A fingerprint and proximity sensing apparatus 100b in FIG. 5A and FIG. 5B is similar to the fingerprint and proximity sensing apparatus 100 in FIG. 2 and FIG. 3, only the differences are described hereinafter. In the present embodiment, the fingerprint and proximity sensing apparatus 100b does not have the proximity sensing light emitting diode 130, and the fingerprint sensor 120 performs both fingerprint recognizing and proximity sensing functions. To be more specific, the light emitting diode display 111a of the display panel 110 includes a plurality of light-emitting diodes (LEDs), such as organic light-emitting diodes (OLEDs) or micro light emitting diodes (micro-LEDs). The optical sensing array 121 of the fingerprint sensor 120 is configured to receive the first light L1, which is emitted from the LEDs of the light emitting diode display 111a of the display panel 110, at the first time period T1 and the second time period T2. For example, in case that the fingerprint and proximity sensing apparatus 100b is applied to the smartphone, the first time period T1 is the time period that the user needs to provide the fingerprint for identification purpose, such as unlock the smartphone or unlock an app in the smartphone, etc., and the second time period T2 is the time period that the user are making a phone call. That is to say, the fingerprint sensor 120 performs both fingerprint recognizing and proximity sensing functions at two different time periods.

In the first time period T1, for example, when the user needs to provide fingerprint to unlock the smartphone, the first object 140a, such as the finger of the user, is in contact with the display panel 110 at the position corresponding to the optical sensing array 121, the first light L1 is emitted from the light emitting diode display 111a of the display panel 110 and then is reflected by the first object 140a to the optical sensing array 121 for fingerprint recognition, as described in the previous embodiments. However, in the second time period T2, for example, when the user are making a phone call, the second object 140b, such as the cheek of the user, is in front of but not in contact with the display panel 110, the first light L1 is emitted from the light emitting diode display 111a of the display panel 110 and then is reflected by the second object 140b to the optical sensing array 121 for proximity sensing. That is to say, only the optical sensing array 121 and the first light L1 emitted from the display panel 110 are exploited to perform both fingerprint recognizing and proximity sensing functions at two different time periods. Therefore, an additional proximity sensing light emitting diode is not required.

Figure 6A:
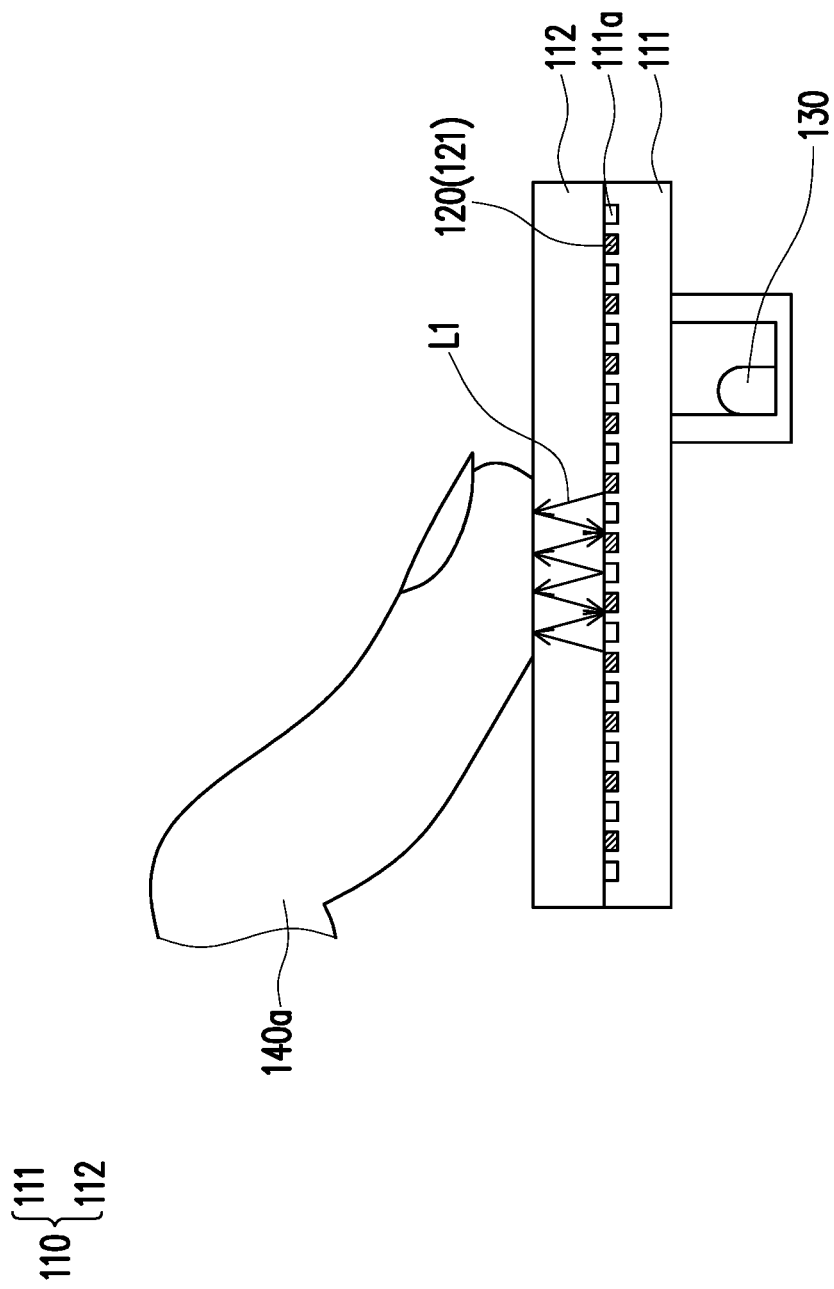
FIG. 6A is cross-sectional schematic view of a fingerprint and proximity sensing apparatus at the first time period according to another embodiment of the disclosure.
Figure 6B:
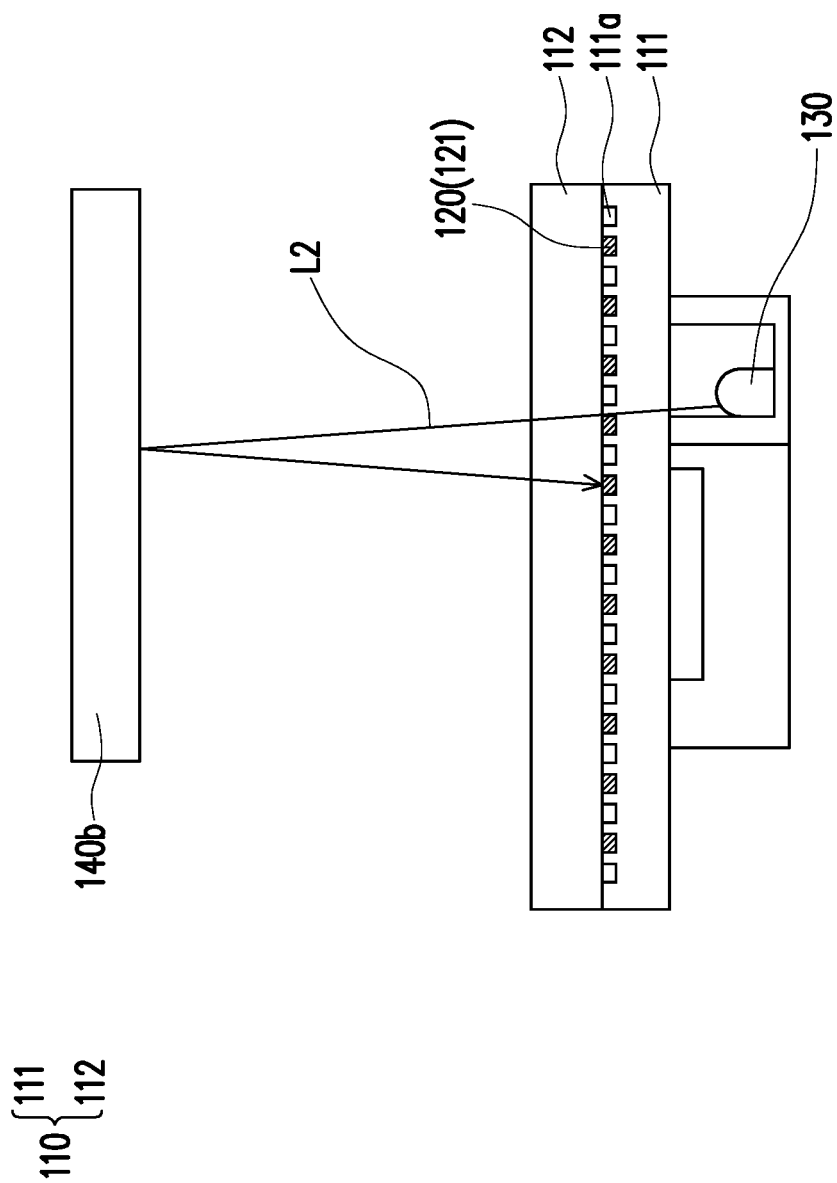
FIG. 6B is cross-sectional schematic view of the fingerprint and proximity sensing apparatus of FIG. 6A at the second time period.

FIG. 6A is cross-sectional schematic view of a fingerprint and proximity sensing apparatus at the first time period according to another embodiment of the disclosure. FIG. 6B is cross-sectional schematic view of the fingerprint and proximity sensing apparatus of FIG. 6A at the second time period. A fingerprint and proximity sensing apparatus 100c of the present embodiment is similar to the fingerprint and proximity sensing apparatus 100 in FIG. 2 and FIG. 3, only the differences are described hereinafter. The fingerprint sensor 120 including the optical sensing array 121 is disposed in the display panel 110 and the proximity sensing light emitting diode 130 is disposed under the display panel 110. In other words, the fingerprint sensor 120 is integrated with the display panel 110.

Figure 7:
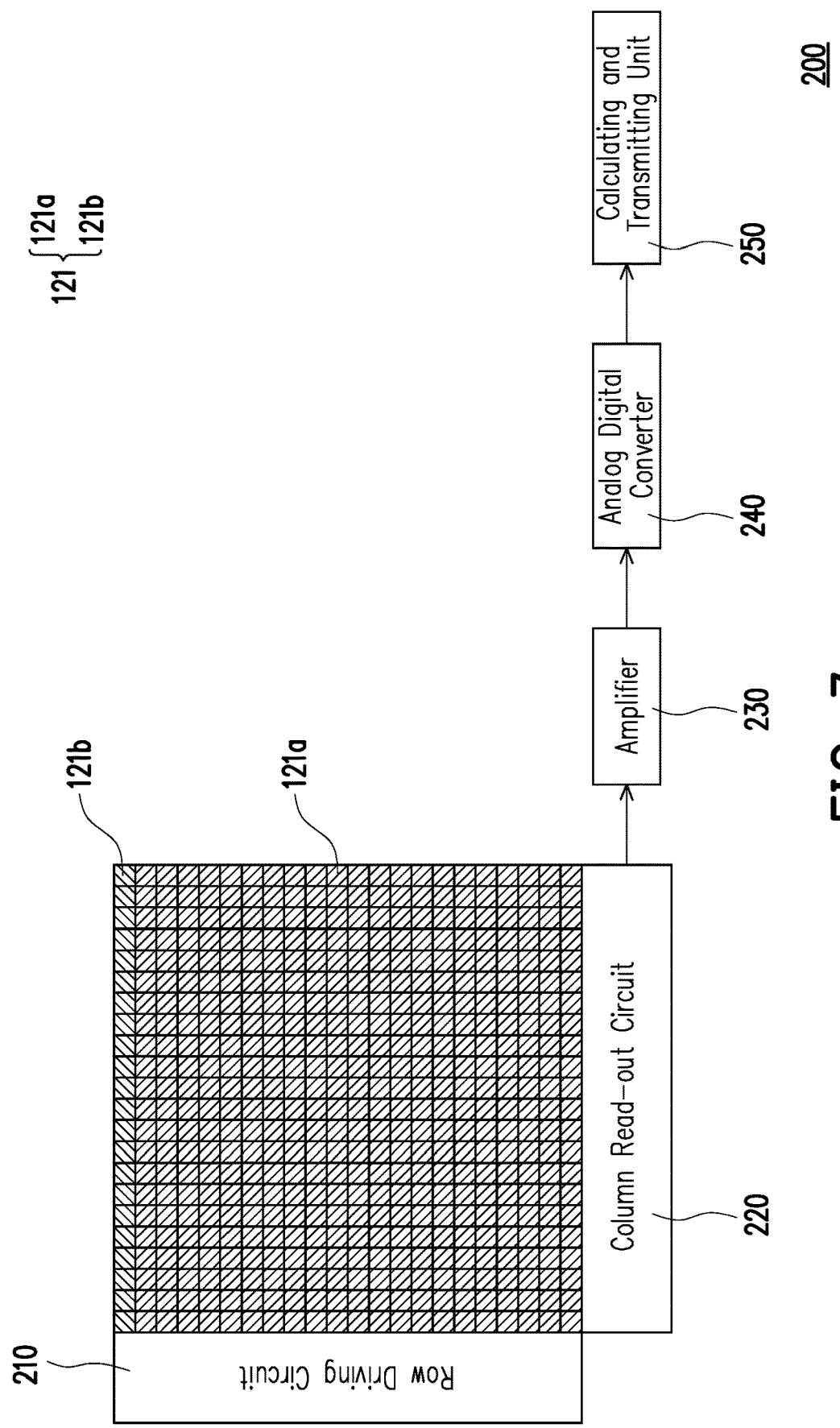
FIG. 7 is a schematic view of a driving circuit of a fingerprint and proximity sensing apparatus according to another embodiment of the disclosure.

FIG. 7 is a schematic view of a driving circuit of a fingerprint and proximity sensing apparatus according to another embodiment of the disclosure. The optical sensing array 121 includes the fingerprint sensing array 121a and the proximity sensing array 121b. In the embodiment, the fingerprint sensing array 121a and the proximity sensing array 121b are driven by a same circuit that is a driving circuit 200. As shown in FIG. 7, the driving circuit 200 includes a row driving circuit 210 and a column read-out circuit 220. The photo diodes of the fingerprint sensing array 121a and the proximity sensing array 121b are driven by the row driving circuit 210 and the column read-out circuit 220 of the driving circuit 200. In the present embodiment, the driving circuit 200 further includes an amplifier 230, an analog digital converter 240, and a calculating and transmitting unit 250. The row driving circuit 210 and the column read-out circuit 220 are coupled to the amplifier 230, the amplifier 230 is coupled to the analog digital converter 240, and the analog digital converter 240 is coupled to the calculating and transmitting unit 250. In other words, the amplifier 230, the analog digital converter 240, and the calculating and transmitting unit 250 are shared by the row driving circuit 210 and the column read-out circuit 220, so as to reduce space (chip area) and cost. That is, the fingerprint sensing array 121a and the proximity sensing array 121b are driven by the same circuit, so as to reduce space (chip area) and cost.

It should be noted here, the row driving circuit 210 provides control signals for the optical sensing array 121, so as to provide photo-sensitive reset signals (rst), photo-sensitive output signals (tx), or select signals (sel) for each row of the photo diodes (or sensing pixels) in sequence. When selectively receiving these signals, the light sensing voltage of the photo diode (or sensing pixel) can be reset, the photo diode (or sensing pixel) can be exposed and output signal.

When the row driving circuit 210 provides the photosensitive output signals (tx) for an entire row of photo diodes (or sensing pixels), each of the photo diodes (or sensing pixels) in the entire row of photo diodes outputs signal to the column read-out circuit 220. Simultaneously, the column read-out circuit 220 samples the signal outputted from the photo diodes and sequentially outputs the signals (voltages) obtained by each of the photo diodes in the entire row of photo diodes to the amplifier 230 through a multiplexer. After that, the signals are amplified by the amplifier 230 and then are provided to the analog digital converter 240 to be converted to digital signals. Next, the digital signals are provided to the calculating and transmitting unit 250 for other operations.

For example, the row driving circuit 210 provides signals for the fingerprint sensing array 121*a* in the first time period T1 and provides the signals for the proximity sensing array 121*b* in the second time period T2. The column read-out circuit 220 receives the first sensing signals from the fingerprint sensing array 121*a* in the first time period T1 and receives the second sensing signals from the proximity sensing array 121*b* in the second time period T2. It should be noted here, the first time period T1 and the second time period T2 are different from each other. The amplifier 230 receives and amplifies the first sensing signals and the second sensing signals from the column read-out circuit 220 to obtain the first amplified sensing signals and the second amplified sensing signals. The analog digital converter 240 receives and converts the first amplified sensing signals and the second amplified sensing signals to the first converted sensing signals and the second converted sensing signals. Finally, the calculating and transmitting unit 250 receives the first converted sensing signals and the second converted sensing signals for other operations, such as fingerprint recognizing or proximity sensing.

Therefore, through the row driving circuit 210 selecting the row of photo diodes, the fingerprint sensing array 121*a* or the proximity sensing array 121*b* can be selected to be exposed and then output signals. When the proximity sensing function is performed, the photo diodes of the proximity sensing array 121*b* are reset to reset voltage, are exposed, and then output signals to the column read-out circuit 220. At this time, the signals provided for the amplifier 230 from the column read-out circuit 220 are signals required for proximity sensing. In addition, when the fingerprint recognizing function is performed, the photo diodes of the fingerprint sensing array 121*a* are reset to a reset voltage and exposed, and then output signals to the column read-out circuit 220. At this time, the signals received by the column read-out circuit 220 are signals required for fingerprint recognizing.

In the present embodiment, the fingerprint sensing array 121*a* and the proximity sensing array 121*b* are driven, according to a time-division scheme, by the same circuit which includes the amplifier 230, the analog digital converter 240, and the calculating and transmitting unit 250. However, the disclosure is not limited thereto. In other embodiments, the fingerprint sensing array 121*a* and the proximity sensing array 121*b* are respectively driven by two different circuits which can totally separate circuits or partially integrated circuits.

Figure 8:
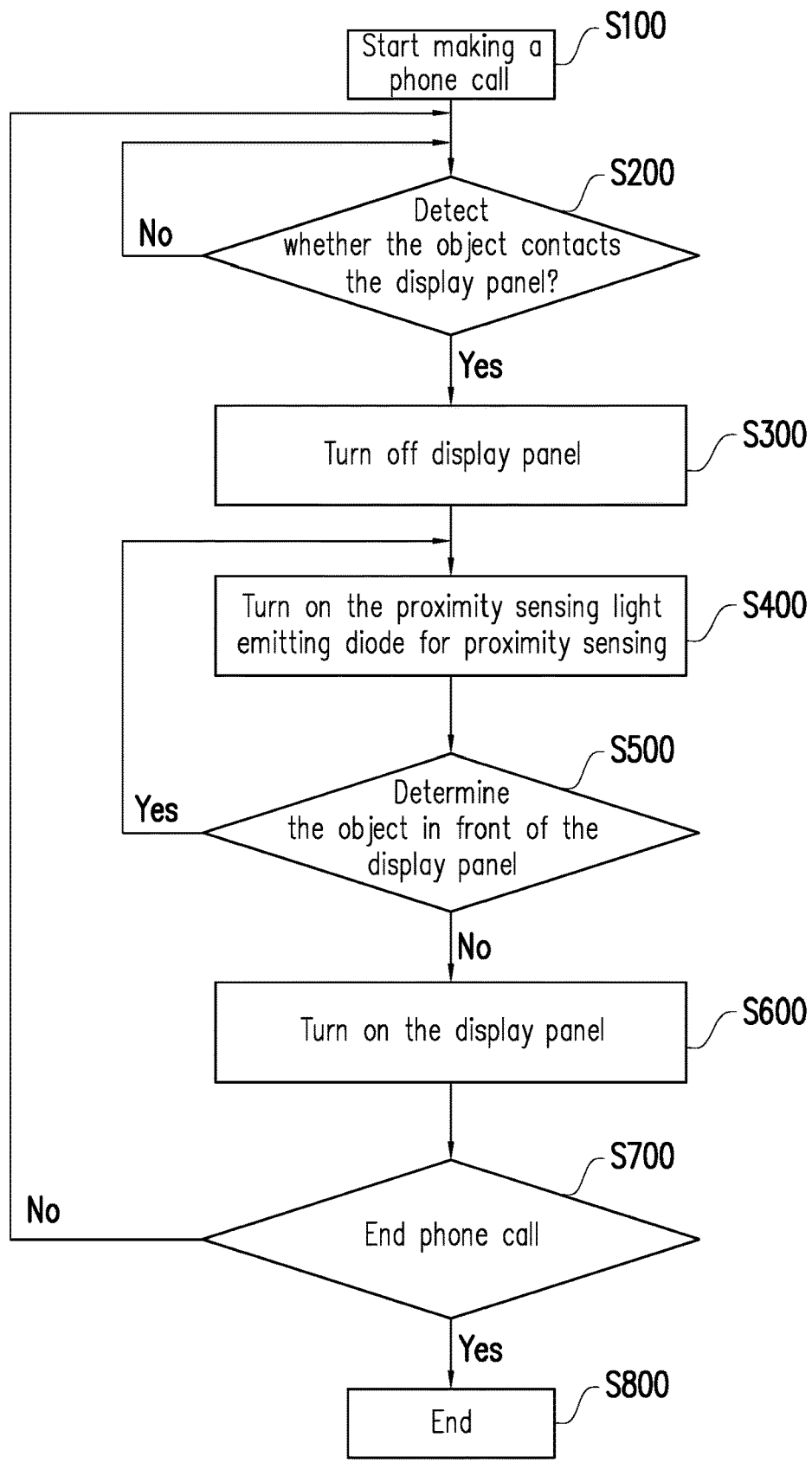
FIG. 8 is a flow chart illustrating a sensing process using a fingerprint and proximity sensing apparatus according to another embodiment of the disclosure.

FIG. 8 is a flow chart illustrating a sensing process using a fingerprint and proximity sensing apparatus according to another embodiment of the disclosure. In the present embodiment, any of the fingerprint and proximity sensing apparatuses 100, 100*a*, and 100*b* mentioned above is applied to a smartphone and is call "the fingerprint and proximity sensing apparatus". In other embodiments, the fingerprint and proximity sensing apparatus may be applied to a tablet or computer with touch screen, etc., but the disclosure is not limited thereto.

In step S100, the user use the smartphone to start making a phone call. At this time the fingerprint and proximity sensing apparatus detects whether an object is in contact with the display panel 110, as shown in step S200. The object may be the face or the cheek of the user. If the result is "no", it means that the object is not in contact with the display panel 110. When the object is not in contact with the display panel 110, the fingerprint and proximity sensing apparatus continues to detect, and the step S200 is still performed. If the result is "yes", it means that the object is in contact with the display panel 110. When the object is in contact with the display panel 110, the display panel 110 is turned off as mentioned in step 5300.

Next, in step S400, the proximity sensing light emitting diode 130 is turned on for proximity sensing. To be more specific, the proximity sensing light emitting diode 130 emits the second light L2 (infrared light) after being turned on. In step S500, it is determined whether there is the object is in front of the display panel 110 according to whether the optical sensing array 121 receives the second light L2 or not. To be more specific, when the optical sensing array 121 receives the second light L2, the result is "yes", it means that the user is still making the phone call and the user's face or cheek is close to the display panel 110. At this time, the proximity sensing light emitting diode 130 is continuously turned on for proximity sensing and it is returned to step S400. When the optical sensing array 121 does not receive the second light L2, the result is "no", it means that the user is still making the phone call, but the user's face or cheek is not close to the display panel 110. The user may be need to look at some information stored in the smartphone, so the display panel 110 is turned on as mentioned in step S600.

Further, in step S700, it is determined whether the phone call is ended. If the result is "no", it means that the phone call is not ended. It is returned to step S200 to detect whether the object is in contact with the display panel 110. If the result is "yes", it means that the phone call is ended, and the proximity sensing light emitting diode 130 is turned off as mentioned in step S800. The purpose of this sensing process (or proximity sensing process) is to prevent the proximity sensing light emitting diode 130 and the display panel 110 from being turned on at the same time.

In summary, in the embodiments of the disclosure, since the proximity sensing light emitting diode is disposed adjacent to the optical sensing array, the optical sensing array can be used to receive both the first light emitted from the display panel and the second light emitted from the proximity sensing light emitting diode at different time periods in order to perform both fingerprint recognizing function and proximity sensing function. That is to say, there is no need to have two totally different devices to respectively perform fingerprint recognizing function and proximity sensing function, but more devices and/or circuit can be used in common. To be more specific, it is not necessary to place a proximity sensor placed in the display panel, so the area for displaying image of the display panel becomes larger. For example, when the fingerprint and proximity sensing apparatus is applied to a smartphone, the proximity sensor is not placed at the area beside the front lens of the display panel of the smartphone. Therefore, the size of the area beside the front lens is reduced and thus save the space under the display panel of the smartphone.

In addition, the fingerprint sensing array and the proximity sensing array are driven by the same circuit, so as to reduce space (chip area) and cost. Further, the sensing process using the fingerprint and proximity sensing apparatus is for the purpose of preventing the proximity sensing light emitting diode and the display panel from being turned on at the same time.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A fingerprint and proximity sensing apparatus, for fingerprint recognizing and proximity sensing, comprising:
   a display panel;
   a fingerprint sensor having an optical sensing array; and
   at least one proximity sensing light emitting diode,
      wherein the optical sensing array is configured to receive a first light emitted from the display panel and a second light emitted from the at least one proximity sensing light emitting diode at different time periods, thereby separately performing the fingerprint recognizing and the proximity sensing,
      wherein the first light and the second light have different ranges of wave length.

2. The fingerprint and proximity sensing apparatus as recited in claim 1, wherein the different time periods comprises a first time period and a second time period different from each other.

3. The fingerprint and proximity sensing apparatus as recited in claim 2, wherein, in the first time period, an object is in contact with the display panel, the first light is emitted from the display panel and then is reflected by the object to the optical sensing array for fingerprint recognition.

4. The fingerprint and proximity sensing apparatus as recited in claim 2, wherein, in the second time period, an object is in front of the display panel, the second light is emitted from the at least one proximity sensing light emitting diode and then is reflected by a second object to the optical sensing array for proximity sensing.

5. The fingerprint and proximity sensing apparatus as recited in claim 1, wherein the at least one proximity sensing light emitting diode is an infrared light emitting diode, and the second light emitted from the at least one proximity sensing light emitting diode comprises an infrared light.

6. The fingerprint and proximity sensing apparatus as recited in claim 1, wherein the display panel comprises a light emitting diode display.

7. The fingerprint and proximity sensing apparatus as recited in claim 1, wherein the fingerprint sensor and the at least one proximity sensing light emitting diode are disposed under the display panel.

8. The fingerprint and proximity sensing apparatus as recited in claim 7, wherein the at least one proximity sensing light emitting diode is disposed adjacent to the optical sensing array of the fingerprint sensor.

9. The fingerprint and proximity sensing apparatus as recited in claim 7, wherein the at least one proximity sensing light emitting diode is integrated with the fingerprint sensor.

10. The fingerprint and proximity sensing apparatus as recited in claim 1, wherein the fingerprint sensor is disposed in the display panel and the at least one proximity sensing light emitting diode is disposed under the display panel.

11. The fingerprint and proximity sensing apparatus as recited in claim 1, wherein the optical sensing array comprises a fingerprint sensing array and a proximity sensing array.

12. The fingerprint and proximity sensing apparatus as recited in claim 11, wherein the fingerprint sensing array and the proximity sensing array are separated from each other.

13. The fingerprint and proximity sensing apparatus as recited in claim 11, wherein the fingerprint sensing array and the proximity sensing array overlap with each other.

14. The fingerprint and proximity sensing apparatus as recited in claim 11, further comprising an infrared light cut filter configured to block infrared light, wherein the infrared light cut filter is disposed on the fingerprint sensing array.

15. The fingerprint and proximity sensing apparatus as recited in claim 11, further comprising an infrared filter configured to allow infrared light passing through, and the infrared filter is disposed on the proximity sensing array.

16. The fingerprint and proximity sensing apparatus as recited in claim 11, wherein the fingerprint sensing array and the proximity sensing array are driven by a same circuit.

17. A fingerprint and proximity sensing apparatus, for fingerprint recognizing and proximity sensing, comprising:
   a display panel comprising a plurality of light emitting diodes (LEDs); and
   a fingerprint sensor having an optical sensing array, wherein the optical sensing array is configured to receive a first light and a second light emitted from the LEDs of the display panel at a first time period and a second time period, respectively,
   wherein, in the first time period, a first object is in contact with the display panel, the first light is emitted from the display panel and then is reflected by the first object to the optical sensing array for fingerprint recognition, and
   wherein, in the second time period, a second object is in front of but not in contact with the display panel, the second light is emitted from the display panel and then is reflected by the second object to the optical sensing array for proximity sensing, whereby the fingerprint recognizing and the proximity sensing are performed separately.

18. A data processing apparatus, configured to drive a sensing array of a fingerprint and proximity sensing apparatus, the sensing array comprising a fingerprint sensing array and a proximity sensing array, the data processing apparatus comprises:
   a row driving circuit, providing signals for the fingerprint sensing array in a first time period and providing the signals for the proximity sensing array in a second time period, wherein in the second time period, the row driving circuit does not provide the signals for the fingerprint sensing array; and
   a column read-out circuit, receiving first sensing signals from the fingerprint sensing array in the first time period and receiving second sensing signals from the proximity sensing array in the second time period, wherein the first time period and the second time period are different from each other, and in the second time period, the column read-out circuit does not receive the first sensing signals for the fingerprint sensing array.

19. The data processing apparatus as recited in the claim 18, further comprising:
   an amplifier, receiving and amplifying the first sensing signals and the second sensing signals from the column read-out circuit to obtain first amplified sensing signals and second amplified sensing signals, respectively;

an analog digital converter, receiving and converting the first amplified sensing signals and the second amplified sensing signals to first converted sensing signals and second converted sensing signals; and a calculating and transmitting unit, receiving the first converted sensing signals and the second converted sensing signals.

* * * * *